United States Patent Office 2,990,855
Patented July 4, 1961

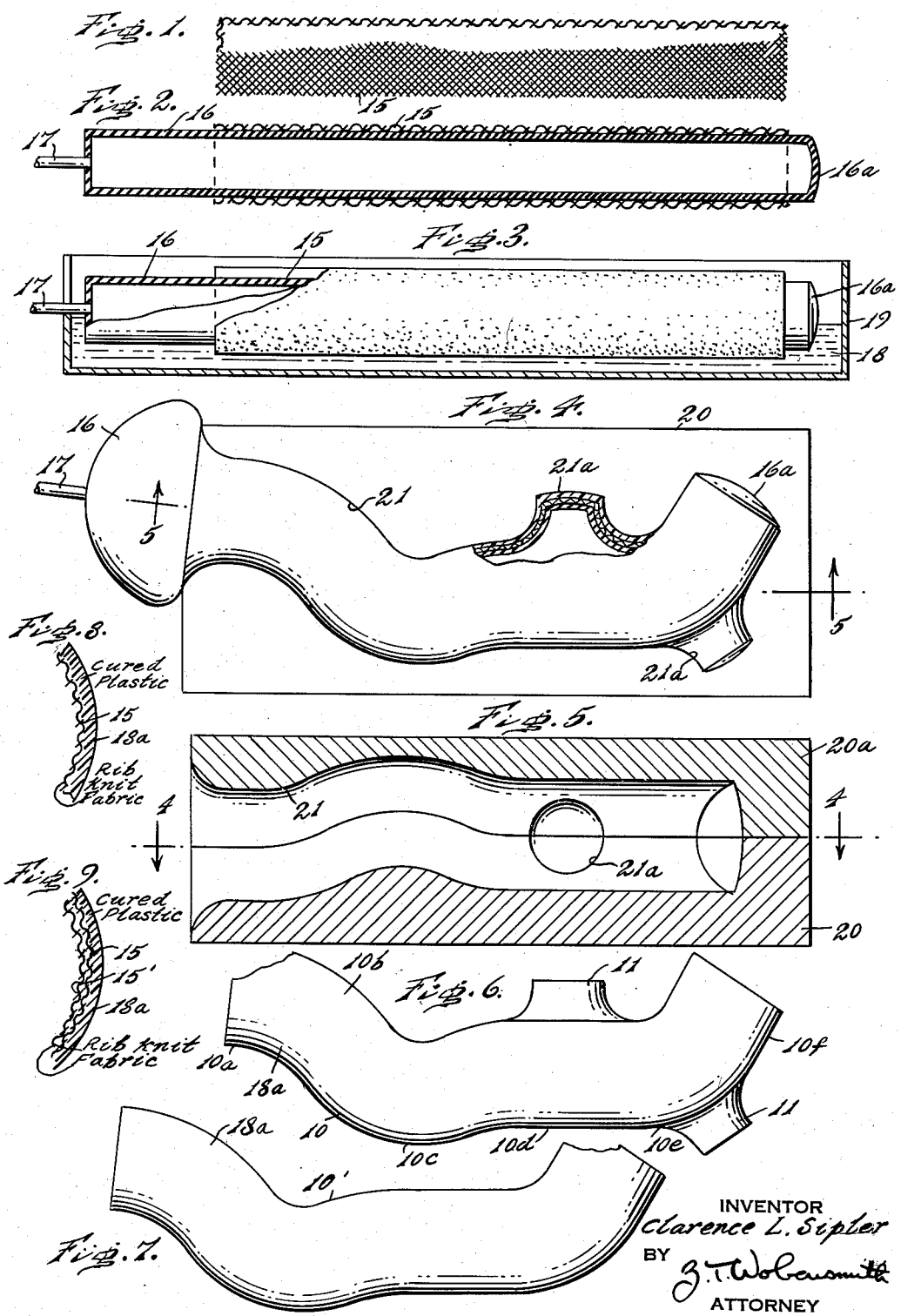

2,990,855
TUBULAR CONDUITS
Clarence L. Sipler, Hatboro, Pa.
(214 S. Main St., Doylestown, Pa.)
Original application Nov. 19, 1957, Ser. No. 697,351. Divided and this application Sept. 12, 1958, Ser. No. 760,678
5 Claims. (Cl. 138—145)

This invention relates to tubular conduits and methods of making the same, and more particularly to conduits suitable for air, gas or liquid flow, under pressure or vacuum.

It has heretofore been proposed to provide a conduit connecting an air cleaner to the carburetor of an automotive vehicle. Such a conduit is required to have a tortuous shape between its ends so as not to engage with other parts of the motor. Accordingly, the longitudinal axis of the conduit has both curved and straight portions and the axis is not disposed in any one plane.

It has heretofore been proposed to use rubber hose for conduit purposes but this hose, when subjected to vacuum and particularly after a period of use in which it is subjected to high temperatures and hydrocarbon vapors, has a tendency to collapse and prevent the desired air flow. Attempts have been made to stiffen such rubber hose by the use of metal coil inserts but this has not proven satisfactory.

No wholly satisfactory conduit for this and like purposes has heretofore been available.

It is the principal object of the present invention to provide a tubular conduit which is non-porous and retains its freedom from porosity over an indefinite and long period of time.

It is a further object of the present invention to provide a tubular conduit which is heat resistant, and which by the use of proper components can be made resistant to relatively high temperatures of the order of 500° F.

It is a further object of the present invention to provide a tubular conduit which is also resistant to low temperatures of the order of −60° F. in addition to being resistant to high temperatures.

It is a further object of the present invention to provide a conduit which is rigid and non-collapsible, particularly when used for vacuum operation, and which retains these characteristics over a prolonged period of time.

It is a further object of the present invention to provide a tubular conduit having an enhanced freedom from likelihood of corrosion or adverse effects from hydrocarbons, or other solvent materials, and which is weather resistant.

It is a further object of the present invention to provide a tubular conduit which will not dent or shatter and which can have a thin wall so as to permit of greater volume of air or gas flow.

It is a further object of the present invention to provide a tubular conduit which is light in weight in comparison with conduits heretofore available.

It is a further object of the present invention to provide improved methods of making tubular conduits and particularly such conduits of odd shapes and sizes, and of permanent shape which cannot be readily formed of metal.

It is a further object of the present invention to provide improved methods of making permanently shaped tubular conduits of odd shapes and sizes and which cannot be made of flexible materials.

It is a further object of the present invention to provide improved methods of making tubular conduits in which the shape can change from an axially curved section to an axially straight section and again to an axially curved section in a different plane, and without any seams or laps.

It is a further object of the present invention to provide improved methods of making tubular conduits in which a fabric lamination or multiple fabric laminations can be employed with a permanent impregnation of thermosetting resin and in which the fabric lamination has an initially high order of circumferential expansibility.

It is a further object of the present invention to provide improved methods of making tubular conduits employing a fabric lamination or a multiple fabric lamination impregnated with a thermosetting resin and in which the desired shape of the conduit can be readily attained and maintained.

It is a further object of the present invention to provide improved methods of making tubular conduits in which, if desired, manifold openings can also be incorporated in a unitary structure.

Other objects and advantageous features of the invention will be apparent from the description and claims.

The nature and characteristic features of the invention will be more readily understood from the following description, taken in connection with the accompanying drawings forming part thereof, in which:

FIGURE 1 is a view in elevation of one of the knitted fabric components employed in connection with the invention;

FIG. 2 is a view in elevation showing an interior mold member inserted in the component of FIG. 1;

FIG. 3 is a vertical sectional view showing the resin applying step in the formation of the tubular conduit;

FIG. 4 is a horizontal sectional view, taken approximately on the line 4—4 of FIG. 5, and showing further steps in the production of the tubular conduit;

FIG. 5 is a vertical sectional view taken approximately on the line 5—5 of FIG. 4;

FIG. 6 is a view in elevation of one form of tubular conduit removed from the mold;

FIG. 7 is a view in elevation of another form of tubular conduit in accordance with the invention;

FIG. 8 is a fragmentary transverse sectional view taken through the wall of the tubular conduits shown in FIGS. 6 and 7; and FIG. 9 is a fragmentary transverse sectional view taken through the wall of the tubular conduits shown in FIGS. 6 and 7 and illustrating a modified construction.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to FIG. 6 of the drawings, a continuous integral rigid tubular conduit 10 in accordance with the invention is there illustrated and includes an end section 10a, a curved section 10b from which another curved section 10c extends. From the curved section 10c a relatively straight section 10d extends and is connected by another curved section 10e to an end section 10f. While the section 10a to f are generally circular cylindrical the longitudinal axis is a tortuous line in a multiplicity of planes.

The tubular conduit 10′, shown in FIG. 7, likewise comprises a plurality of continuous sections.

The shape shown in FIGS. 6 and 7 are merely illustrative of various complexly curved tubular conduits which can be made in conformity with the invention.

As shown in FIG. 6 the tubular conduit 10 can, if desired, be provided with one or more branch connections 11 integral with the main body of the conduit 10.

3

The mode of making the tubular conduit 10 or 10' will now be pointed out.

Referring now to FIG. 1 of the drawings, one of the components of the invention is illustrated at 15, and preferably consists of a continuous seamless knitted tubular fabric, preferably rib-knit, so as to be circumferentially expansible and upon expansion free from any tendency to thin out appreciably. While the extent of circumferential expansibility of the knitted tube 15 can be varied, the expansibility is preferably of an order up to about 800%. Any suitable materials for this purpose can be employed, dependent on the degree of heat resistance required. For normal low temperature ranges of the order of 250° F., and suitable for many automotive conduits, cotton or rayon, and nylon, Dacron, or other thermoplastic yarns can be employed for the making of the knitted tube 15.

If a higher order of temperature resistance is required, say up to 500° F., it is preferred that the knitted tube 15 be made of yarns of glass fibers or asbestos.

It is also feasible to use yarns having mixtures of the filamentary materials referred to, or strands of different materials can be employed on different carriers, or needles, in knitting the fabric.

For certain purposes, also, a plurality of knitted tubes 15, each with the yarns of different materials can be employed as hereinafter explained. The texture of such knitted tubes 15 can be varied, if desired, and as hereinafter explained.

An inflatable rubber cylindrical core tube 16 is provided, closed at one end 16a (see FIG. 2) and at the other end has a valved inlet connection 17. The core tube 16 is preferably of rubber, natural or synthetic, and of a thickness of the type ordinarily used for inner tubes for tires of automotive vehicles. The core tube 16, in the substantially deflated condition, is inserted lengthwise within a knitted tube 15 as shown in FIG. 2. At this time, if desired, a partial inflation of the core tube 16 can be effected, but this is not usually required.

If a smoother interior of the tubular conduit 10 or 10' is desired an additional knitted tube 15' can be interposed between the core tube 16 and the outer knitted tube 15.

The core tube 16 with one or more knitted tubes 15 thereon is then dipped into a suitable liquid resin 18, in a receptacle 19, so that the outer surface of the outer knitted tube 15 is covered with the liquid resin 18.

The resin 18 is preferably of the thermosetting type and can be a phenolic resin, a silicone resin, or a polyester resin, with suitable catalysts and curing agents incorporated therein and of suitable viscosity for application to knitted tube 15 and for subsequent treatment.

A polyester resin has been found particularly suitable for the purposes of the present invention, and one preferred composition consists of an unsaturated polyester resin having incorporated therein about 26% of an inert filler. Hydrated aluminum silicate has been found particularly suitable, as it serves as a filler, reduces the exothermic reaction, provides a dense structure, eliminates porosity in the finished article, aids in the adjustment of the viscosity, and provides a better finish and quality in the completed article. The resin and filler in the proportions of about 48% by weight is employed, and to control the viscosity it is preferred to use monomeric styrene to provide the proper viscosity. While the quantity of monomeric styrene can be varied, about 24% by weight has been found suitable with departures of several percent in either direction to adjust the viscosity so that the liquid resin 18 will penetrate the knitted tube 15, as herein explained, but will not be extruded unduly from the mold.

The liquid resin, preferably just before application to the knitted tube 15, preferably has incorporated therein a suitable accelerator and for this purpose 0.7% by weight of cobalt naphthanate (6% solution) has been found satisfactory. A suitable catalyst is preferably also incorporated at the same time and for this purpose 0.8% by weight of 60% methyl ethyl ketone peroxide in dimethyl phthylate has been found satisfactory.

In order to determine the exterior shape of the tubular conduit 10 or 10' a mold is provided and while any preferred form of mold can be employed, as shown in FIGS. 4 and 5, it is preferred to use a metallic mold of two or more separable parts 20 and 20a having an interior cavity 21 of the desired shape to be provided on the finished conduit. The interior cavity 21 can be cast therein by employing a master or pattern (not shown) and the surface thereof does not require any high quality finish. If desired, the cavity 21 can have sidewise branches 21a for providing the branch connections 11.

The resin dipped knitted tube 15 with the core tube 16 therein is inserted in the mold 20, 20a and along the cavity 21 with the end 16a at a corresponding end of the cavity 21 and the mold 20, 20a closed and clamped in closed position.

The core tube 16 is then inflated to apply an internal pressure of the order of about 30 to 33 p.s.i. The application of the pressure by the core tube 16 causes the fabric of the knitted tube 15 to expand radially and circumferentially and to shape itself to the shape determined by the shape of cavity 21. At the same time the liquid resin is caused to impregnate the interstices between the yarns of the knitted tube 15 and the interstices between the fibers of the yarn.

Heat is then applied to the mold 20, 20a for a predetermined time period which, for the specific polyester resin stated above, is at 215° F. plus or minus 2°, and for a time period of about 50 to 60 seconds. A curing or setting of the resin in impregnating relation to the knitted tube or tubes 15 is thus effected, the cured resin being indicated at 18a.

Upon the completion of the curing in this manner the core tube 16 is deflated, the mold 20, 20a is separated and the completed tubular conduit 10 or 10' is removed. The ends of the branch connections 11, if these have been included are severed by transverse sawing or the like. The ends of the conduit 10 or 10' are trimmed, as required.

The completed tubular conduit 10 or 10' can be buffed if needed and the flash removed. No other finishing operation is required but the tubular conduit 10 or 10' is then ready for use.

If a particularly smooth interior is desired in the tubular conduit an additional interior tubular fabric lamination 15', as shown in FIG. 9, having a smoother surface when expanded can be inserted within the interior of the main tubular fabric lamination 15 prior to the insertion of the core tube 16.

The tubular conduit 10 or 10' made as herein set forth can be readily provided with the desired permanent tortuous shape, is rigid and strong, free from porosity, light in weight, resistant to high and low temperatures, and is inert and free from likelihood of damage particularly in automotive applications.

This application is a division of application Serial No. 697,351, filed November 19, 1957.

I claim:

1. A monolithic tubular conduit comprising a light weight non-metallic rigid tube having a varying cross sectional shape between its ends, said tube having a fixed tortuous non-planar longitudinal axis between its ends and having portions of said axis lying in a series of planes, said tube having an interior circumferentially expanded tubular continuous seamless knitted fabric portion open at its ends, said fabric portion being stretched and distorted thereby conforming to the shape of the surface of the tube, said tubular knitted portion being surrounded by and being impregnated with an integral rigid cured resin providing a monolithic unit resistant to heat and cold.

2. A tubular conduit as defined in claim 1, in which the yarn of said knitted fabric is of asbestos.

3. A tubular conduit as defined in claim 1, in which the yarn of said knitted fabric is of glass fibers.

4. A tubular conduit as defined in claim 1, in which the yarn of said knitted fabric is of cotton.

5. A tubular conduit as defined in claim 1, in which the yarn of said knitted fabric is of thermoplastic material.

References Cited in the file of this patent

UNITED STATES PATENTS

| | | |
|---|---|---|
| 2,594,838 | Alexander et al. | Apr. 29, 1952 |
| 2,609,319 | Boge | Sept. 2, 1952 |
| 2,614,058 | Francis | Oct. 14, 1952 |
| 2,703,109 | Saville | Mar. 1, 1955 |
| 2,752,952 | Dauphinais | July 3, 1956 |
| 2,837,810 | Ekholm | June 10, 1958 |